(12) United States Patent
Burgess

(10) Patent No.: US 11,814,166 B2
(45) Date of Patent: Nov. 14, 2023

(54) FOLDING WING TIP ASSEMBLY WITH LINEAR ACTUATOR

(71) Applicant: Goodrich Actuation Systems Limited, Solihull (GB)

(72) Inventor: Graham James Burgess, Telford (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 42 days.

(21) Appl. No.: 17/537,704

(22) Filed: Nov. 30, 2021

(65) Prior Publication Data

US 2022/0194552 A1 Jun. 23, 2022

(30) Foreign Application Priority Data

Dec. 21, 2020 (EP) ..................................... 20275188

(51) Int. Cl.
*B64C 3/56* (2006.01)

(52) U.S. Cl.
CPC ...................................... *B64C 3/56* (2013.01)

(58) Field of Classification Search
CPC ....................................................... B64C 3/56
See application file for complete search history.

(56) References Cited

U.S. PATENT DOCUMENTS

| | | |
|---|---|---|
| 2,422,056 A | 6/1947 | Vogt |
| 2,719,682 A * | 10/1955 | Handel ..................... B64C 3/56 244/49 |
| 5,310,138 A | 5/1994 | Fitzgibbon |
| 5,372,336 A | 12/1994 | Paez |
| 9,415,857 B2 | 8/2016 | Fox et al. |
| 9,908,612 B2 | 3/2018 | Fox |
| 2022/0024558 A1* | 1/2022 | Horwood .................. B64C 3/56 |

FOREIGN PATENT DOCUMENTS

| | | |
|---|---|---|
| EP | 3254956 A1 | 12/2017 |
| GB | 2567899 A | 5/2019 |
| GB | 2584409 A | 12/2020 |

OTHER PUBLICATIONS

Extended European Search Report for International Application No. 20275188.9 dated Jun. 6, 2021, 8 pages.

* cited by examiner

*Primary Examiner* — Brady W Frazier
*Assistant Examiner* — Shanna Danielle Glover
(74) *Attorney, Agent, or Firm* — CANTOR COLBURN LLP

(57) ABSTRACT

An assembly for moving a tip of an airfoil (e.g., an aircraft wing tip) relative to a fixed body of the airfoil. The assembly includes a linear actuator configured to pivotally attach to both the fixed body of the airfoil and the movable tip of the airfoil, such that the linear actuator is configured to extend between a first pivotal attachment on the fixed body and a second pivotal attachment on the movable tip. The linear actuator is configured to repeatedly move the tip of the airfoil from an unfolded position to a folded position, wherein throughout such movement the linear actuator is configured to pivot about both the first and second pivotal attachments.

12 Claims, 3 Drawing Sheets

FOLDING WING TIP ASSEMBLY WITH LINEAR ACTUATOR

CROSS-REFERENCE TO RELATED APPLICATIONS

This application claims priority to European Patent Application No. 20275188.9 filed Dec. 21, 2020, the entire contents of which is incorporated herein by reference.

TECHNICAL FIELD

The present invention relates to an assembly for moving (e.g., folding or rotating) the tip of an airfoil relative to a fixed body of the airfoil, such as a folding wing tip of an aircraft wing.

BACKGROUND

Increasing the wing span of a fixed wing, commercial aircraft may limit the number of airports at which it can land (for example, airport stands may have a maximum wing span capacity). In military applications, an increased wing span could mean that more storage space is required (for example on an aircraft carrier or in a storage facility). Folding wing tip assemblies are known and used to reduce the span of the wings when the aircraft is on ground. In such assemblies, a distal portion of the wing rotates relative to the rest of the wing to vary the total wing span. Such assemblies have actuations means (typically a rotary actuator) that rotate the distal portion of the wing, and are contained within the body of the wing. Such actuators must be powerful enough to apply the required moment to rotate the distal portion, and as a result these actuators can be quite heavy, which decreases the efficiency of the aircraft.

Accordingly, there is a need to provide a lighter folding wing tip assembly which still provides the necessary moment to rotate the distal wing portion.

SUMMARY

According to a first aspect, there is provided an assembly for moving a tip of an airfoil (e.g., an aircraft wing tip) relative to a fixed body of the airfoil, the assembly comprising a linear actuator configured to pivotally attach to both the fixed body of the airfoil and the movable tip of the airfoil, such that the linear actuator is configured to extend between a first pivotal attachment on the fixed body and a second pivotal attachment on the movable tip, wherein the linear actuator is configured to repeatedly move the tip of the airfoil from an unfolded position to a folded position, wherein throughout such movement the linear actuator is configured to pivot about both the first and second pivotal attachments.

This provides an improved actuation mechanism for moving an airfoil tip (e.g., wing tip) between an unfolded and folded position. In particular, the use of a pivotal attachment on each of the fixed portion and movable portion, as well as a linear actuator extending between the two, provides various technical effects as discussed herein. For example, this means that the actuator can more easily move the airfoil tip, as compared to, e.g., a rotary actuator.

For the purposes of this disclosure, an airfoil (otherwise known as aerofoil) is a body (such as an airplane wing or propeller blade) designed to provide a desired reaction force when in motion relative to the surrounding air.

A lever arm of the linear actuator may increase upon the linear actuator moving the tip of the airfoil from the unfolded position to the folded position. The lever arm is defined as the perpendicular distance from the axis of rotation (e.g., of the tip of the airfoil) to the line of action of applied force (i.e., of the linear actuator, for example its linear/longitudinal axis). Increasing the lever arm in this manner means that it can easily move the airfoil tip throughout its range of movement.

The lever arm of the linear actuator may increase from a minimum value when the tip of the airfoil is in the unfolded position to a maximum value when the tip of the airfoil is in the folded position. The lever arm may increase progressively and/or continuously.

The linear actuator may define a line of action of applied force, wherein the line of action may extend between the first pivotal attachment and the second pivotal attachment throughout the range of movement of the actuator, for example to repeatedly move the tip of the airfoil from the unfolded position to the folded position. The line of action may be parallel and/or coincide with the longitudinal axis of the linear actuator.

An angle between the line of action of applied force of the linear actuator and a longitudinal axis of the fixed body of the airfoil may increase upon the linear actuator moving the tip of the airfoil from the unfolded position to the folded position.

An angle between the line of action of applied force of the linear actuator and a longitudinal axis of the tip of the airfoil may increase upon the linear actuator moving the tip of the airfoil from the unfolded position to the folded position. This means the linear actuator may start at an internal position within the body/frame/etc. of the airfoil (e.g., both the fixed body and the tip) and move to an external position outside the body/frame/etc. of the airfoil (e.g., of both the fixed body and the tip). In other words, the linear actuator is exposed upon moving the tip of the airfoil from the unfolded position to the folded position. This allows the lever arm of the actuator to increase considerably as compared to an arrangement that involves, for example, one or more linkages between multiple actuators that remain within the body/frame/etc. of the airfoil. The assembly may comprise no linkages or other connecting parts, such that the linear actuator can always act along a single line of action throughout its entire range of movement.

The linear actuator may comprise a shaft (e.g., a piston or screw shaft) movable along a longitudinal axis of the linear actuator and extending between the first and second pivotal attachments.

The linear actuator may be configured to rotate the tip through at least about 30, 60 or 90 degrees.

The assembly may further comprise locking means configured to selectively prevent movement of the linear actuator.

The assembly may further comprise one or more doors configured to selectively enclose the linear actuator, e.g., within the airfoil body.

The locking means may be the one or more doors, wherein the doors are configured in a closed position to prevent movement of the linear actuator. The doors may be locked in their closed position by a door locking mechanism. The doors may be configured to prevent pivoting movement of the linear actuator when they are in the closed/locked position (enclosing the linear actuator), which in turn prevents actuation of the linear actuator. This is a particularly useful way of locking the mechanism described herein, which has a synergy with the features provided above (in particular the use of a pivotal attachment on each of the fixed portion and movable portion, as well as a linear actuator extending (and pivoting) between the two attachment locations).

The doors may be configured to open/release (e.g., using a separate actuation mechanism or release of the door locking mechanism) to allow the linear actuator to pivot about both the first and second pivotal attachments as aforesaid.

In an aspect there is provided a wing for an aircraft, comprising a fixed body and a movable tip, wherein the wing comprises an assembly as described above.

The wing tip and main body of the wing may be shaped to allow the wing tip to rotate relative to the main body without obstruction. The wing and main body may have shapes which complement each other when in the extended position, and each comprise tabs and recesses, wherein a tab of the main body is shaped to fit into a recess of the wing tip and vice versa.

According to a further aspect, there is provided a method of moving a tip of an airfoil (e.g., an aircraft wing tip) relative to a fixed body of the airfoil using the assembly as described above.

The method may comprise using the linear actuator to move (e.g., repeatedly) the tip of the airfoil from an unfolded position to a folded position. In operation, the wing tip may be moved to an unfolded position when the aircraft is being prepared for a flight mode, and/or moved to a folded position when the aircraft is on ground.

A longitudinal axis of the linear actuator may not coincide with the axis of rotation of the tip throughout the full range of movement of the linear actuator.

The first and second pivotal attachments of the linear actuator may be both above or both below (e.g., in a vertical direction) the axis of rotation of tip when the tip is in an unfolded position.

The first and second pivotal attachments of the linear actuator may be both above or both below (e.g., in a vertical direction) the axis of rotation of tip when the tip is in an unfolded position.

BRIEF DESCRIPTION OF DRAWINGS

Various embodiments will now be described, by way of example only, and with reference to the accompanying drawings in which.

DETAILED DESCRIPTION

Figure 1:
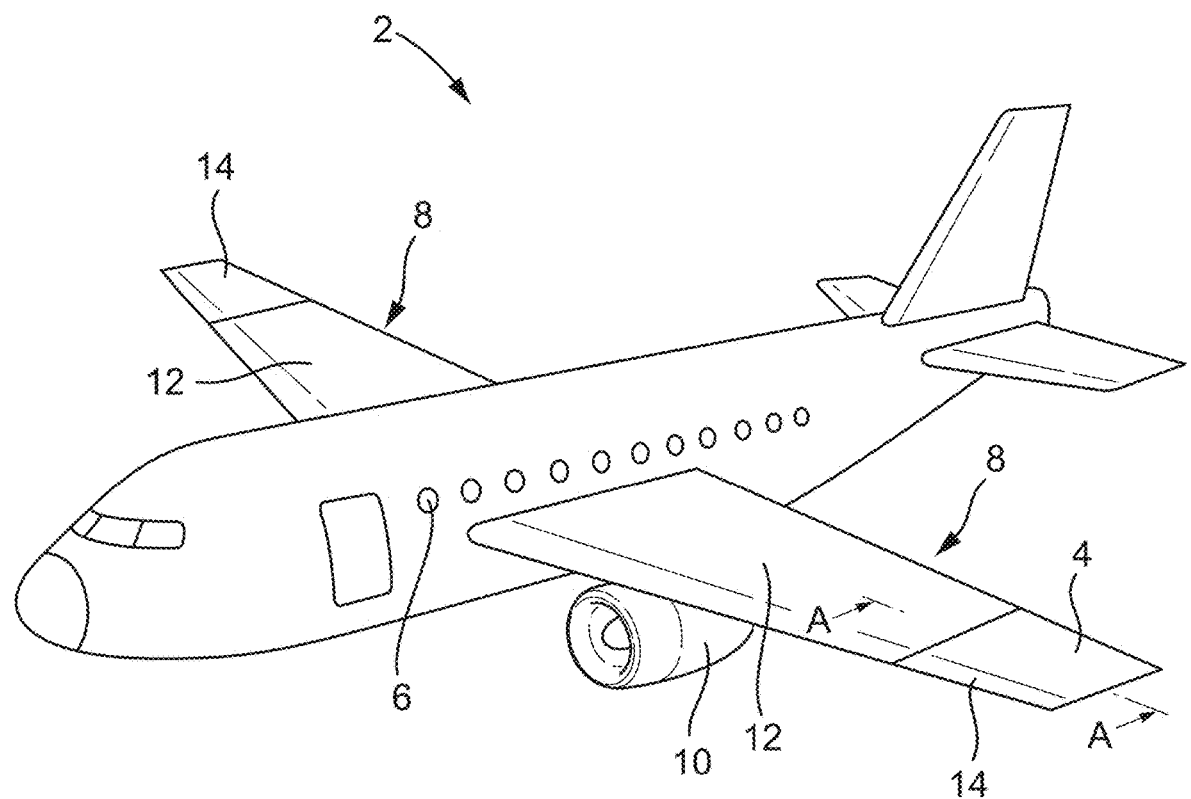
FIG. 1 illustrates a commercial aircraft with foldable wing tips.

FIG. 1 illustrates a commercial aircraft 2 with folding wing tips 4. The aircraft 2 comprises a fuselage 6, two main wings 8, and an engine assembly 10 located under each wing 8. Each wing 8 extends from the fuselage 6 in a generally radial direction (relative to a fuselage central axis).

Each wing 8 of the aircraft 2 comprises a main body 12 and a tip assembly 14 that forms a movable wing tip 4. For the purposes of this disclosure, 'main body' 12 is the fixed portion of the wing 8 (i.e., rigidly attached to the fuselage), and 'tip assembly' 14 is the movable portion of the wing 8 at its distal end.

As discussed above the tip assembly 14 allows the tip 4 of the wing 8 to rotate relative to the main body 12. Although illustrated as a commercial aircraft 2, it would be understood that the present disclosure is not limited to a specific type of aircraft, and the technology described herein could be applied to other types of fixed wing aircraft, for example military aircraft. The technology could also be applied to other types of airfoil that utilise movable tips, for example rudders or helicopter blades, and is not limited to aircraft wings.

Figure 2:
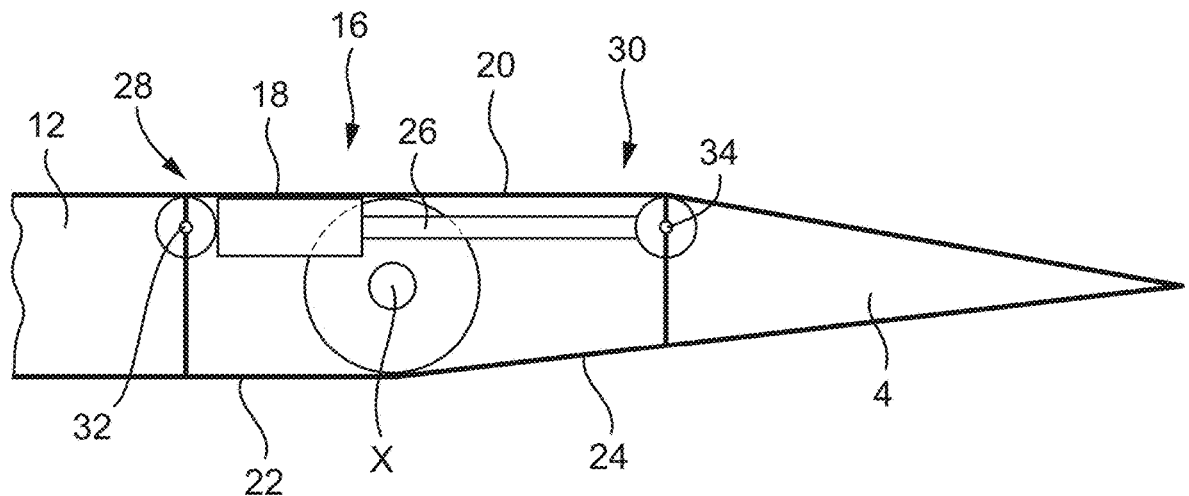
FIG. 2 illustrates a cross-sectional view of a foldable aircraft wing in an extended position.

FIG. 2 illustrates a cross-section A-A (FIG. 1) of the tip assembly 14. The tip assembly 14 includes a movable wing tip 4 and an actuator 16 configured to rotate the wing tip 4 relative to the main body 12 of the wing 8. An axis of rotation X is shown, which defines the axis X about which the wing tip 4 rotates (e.g. via hinges or any suitable means).

The wing tip 4 is shown in the extended position in FIG. 2, which is the position of the wing tip 4 during flight. In the extended position, the top surface 18 of the main body 12 is flush with the top surface 20 of the wing tip 4, and the bottom surface 22 of the main body 12 is flush with the bottom surface 24 of the wing tip 4. This results in a smooth transition between the main body 12 and wing tip 4, which results in an aerodynamic wing shape that reduces drag during flight. The movable wing tip 4 of the present disclosure is shown as less than 10% of the total wing span. The technology disclosed herein is applicable to any dimension of movable wing tip 4, for example a wing tip 4 of about 25% of the total wing span, or even about 50% of the total wing span.

The actuator 16 comprises a linear actuator 26. The linear actuator 26 may be pneumatic, hydraulic, electromechanical, or any other type. For example, the actuator 16 may comprise a piston or other shaft (e.g. screw shaft) movable along an axis, between a retracted position and an extended position. The extended position corresponds to the extended position of the wing tip 4 as shown in FIG. 2.

The actuator 16 has a first end 28 and a second end 30 (opposite to the first end). The actuator 16 is pivotally attached to the main body 12 of the wing 8 at the first end 28, and also pivotally attached to the wing tip 4 at the second, opposite end 30. Thus, the actuator 16 defines two axes of rotation 32, 34. A first axis of rotation 32 is provided by the pivotal attachment at the first end 28, and a second axis of rotation 34 is provided by the pivotal attachment at the second end 30. Thus, the linear actuator 26 extends between the two axes of rotation 32, 34 and is configured to rotate about each of these axes 32, 34 in use.

Figure 3:
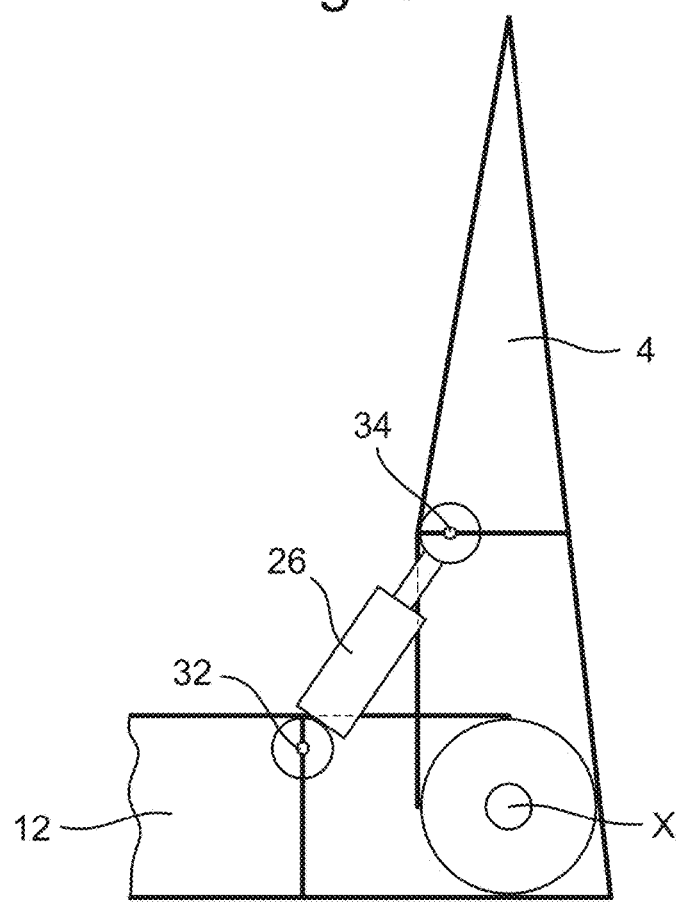
FIG. 3 illustrates a cross-sectional view of a foldable aircraft wing in a folded position.

In the extended/unfolded position of the wing tip 4, as shown in FIG. 2, the linear actuator 26 is also in its extended position. Upon retraction of the linear actuator 26 from its extended/unfolded position, the wing tip 4 rotates to its retracted/folded position, and this is shown in FIG. 3. As will be explained in more detail below, the linear actuator 26 rotates about both axes of rotation 32, 34 during this movement, and brings the axes of rotation 32, 24 of the linear actuator 26 closer together. The linear actuator 26 moves from a first, internal position within the wing body (below the surfaces 18, 20 of the wing) to a second, exposed position outside of the wing body (above the surfaces 18, 20 of the wing 8).

The linear actuator 26 defines a line of action of applied force, wherein the line of action extends in a straight line between the first pivotal attachment 32 and the second pivotal attachment 34 throughout the range of movement of the linear actuator 26 (i.e., when moving the tip 4 of the wing 8 between the extended/unfolded position and the retracted/folded position).

As shown in FIG. 2, when the wing tip is in the extended/unfolded position the axes of rotation 32, 34 of the linear actuator 26 are both displaced (in the same direction) from the axis of rotation X of the wing tip 4. That is, the first and second axes of rotation 32, 34 of the actuator 16 lie above the axis of rotation X of the wing. This is exemplary, however, and the linear actuator 26 and axes of rotation 32, 34 thereof may be placed in any suitable location to effectuate folding of the wing tip.

Displacing the linear actuator 26 from the axis of rotation X of the wing tip 4 allows the linear actuator 26 to easily and efficiently rotate the wing tip 4 (anti-clockwise as shown in FIGS. 2 and 3). This means that a longitudinal axis of the actuator 16 (corresponding in the illustrated embodiment to its line of action of applied force) does not coincide with the axis of rotation X of the wing tip 4 throughout movement of the linear actuator 26 between its extended and retracted positions.

The technology of the present disclosure increases the lever arm of the linear actuator (26) upon the linear actuator (26) moving the tip (4) of the airfoil from the unfolded position to the folded position. The lever arm is the distance between the axis of rotation X of the wing tip 4 and the line of action of applied force of the linear actuator 26. Accordingly, a low force is required from the linear actuator 26 to achieve the moment necessary to overcome the weight of the wing tip 4 and rotate it upwards. In such an arrangement, a small, low power linear actuator 26 may be used to apply the necessary moment, as opposed to, for example, a larger, higher power rotary actuator. The present disclosure therefore has weight saving and power saving advantages over conventional arrangements.

FIGS. 2 and 3 show one linear actuator 26 in the tip assembly 14, and in some embodiments only one may be provided. However, it will be appreciated that there may be more than one linear actuator 26 in each tip assembly 14, for example two, three or more linear actuators 26 could be provided in each tip assembly 14. Where multiple actuators are provided, they may have substantially the same features as described above.

FIG. 3 illustrates the same cross section as FIG. 2, but with the wing tip 4 in a retracted position. As noted above, the wing 8 can be rotated into its retracted position when on ground, for example if a decreased wing span is desired. In the illustrated embodiment the wing tip 4 has been rotated up by the linear actuator 26, and forms an approximate 90 degree angle relative to the main body 12. This could be the fully retracted position of the wing tip 4, or in some cases the wing tip 4 may be rotated through more than 90 degrees.

As the linear actuator 26 retracts from the fully extended position (shown in FIG. 2) to the retracted position (shown in FIG. 3), it moves outside of the wing body and above the surface 18, 20 thereof. Allowing the linear actuator 26 to rotate outside of the wing surface 18, 20 further increases the lever arm between the linear actuator 26 and the wing tip 4. Thus, the more the linear actuator 26 retracts, the larger the moment that can be applied by the linear actuator 26 to the wing tip 4 about the axis of rotation X of the wing tip 4. This is advantageous because the wing tip 4 can experience larger external forces when in the retracted position due to the wing tip 4 being less aerodynamic in that position and thus more susceptible to forces such as wind. This decrease in the force required from the linear actuator 26 means that a less powerful and smaller linear actuator 26 can be used.

Figure 4:
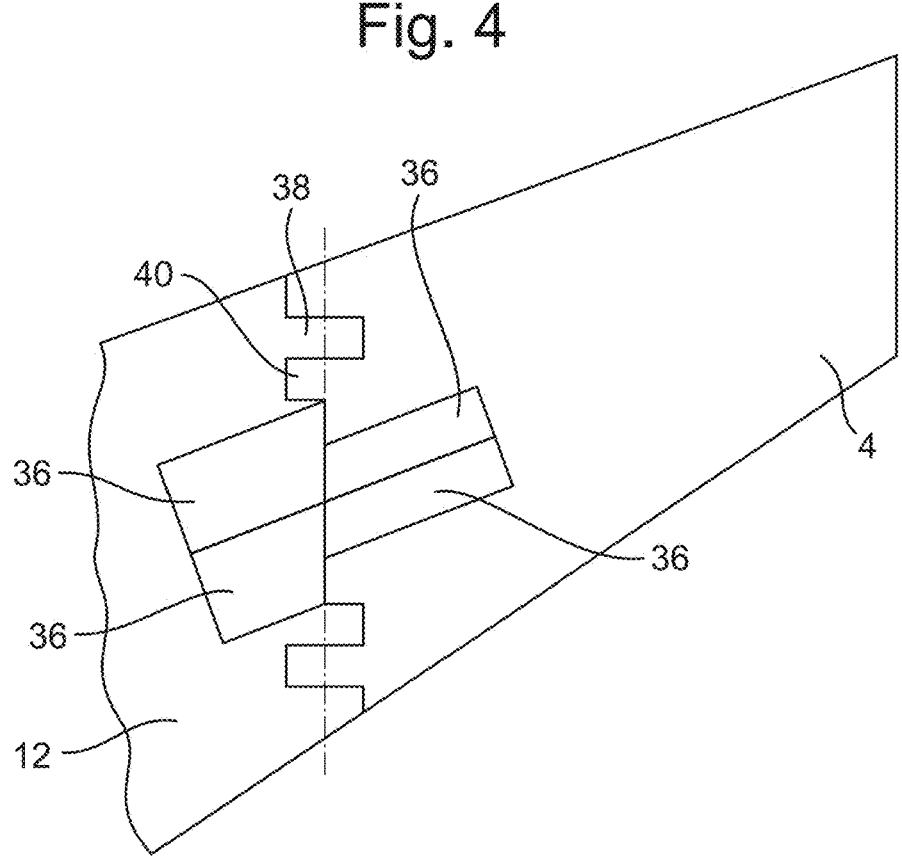
FIG. 4 illustrates a top view of a foldable aircraft wing.

FIG. 4 is a top view of the tip assembly 14 when in the extended position. As shown, the tip assembly 14 further comprises doors 36 that enclose the linear actuator 26. In the illustrated embodiment, there are four doors 36; two on the main body 12 and two on the wing tip 4. Each door 36 is pivotally attached to the respective wing portion 12, 4 by hinges or any suitable means. In the closed position illustrated in FIG. 4, the doors 36 are flush with the top surface 18, 20 of the wing 8 to form a continuous top surface. The doors 36 can be opened by actuating means (not shown) which rotate the doors 36 up and away from each other to expose the linear actuator 26, which is located below the doors 36. This exposure of the linear actuator 26 allows the linear actuator 26 to rotate outside of the wing surface 18, 20, thus allowing the linear actuator 26 to retract the wing tip 4. When the doors 36 are closed, the linear actuator 26 is enclosed and locked in place (at least partly by the doors 36, since the actuator is not able to retract because the doors 36 obstruct rotation thereof). The doors 36 are closed during flight and act as a line of defence in preventing the wing tips 4 from retracting. As another line of defence, power can be removed from the linear actuator 26 by a control system during flight. It would be appreciated that other types of doors could be used, for example sliding doors, and that fewer than or more than four doors could be used. Furthermore, locking pins could be used instead of or as well as the doors 36, or any other suitable locking means. It should be noted that the locking means (e.g., doors 36) are not essential to the broadest aspects of the present disclosure.

As also shown in FIG. 4, the wing tip 4 and main body 12 are shaped to complement each other when in the extended position, and each have tabs 38 and recesses 40, where a tab 38 of the main body 12 is shaped to fit into a recess 40 of the wing tip 4 and visa versa. The recesses 40 and tabs 38 are shaped to allow the wing tip 4 to rotate relative to the main body 12 without obstruction from the main body 12, as the tabs 38 of the wing tip 4 are free to rotate into the recesses 40 of the main body 12, and vice versa. The embodiment in FIG. 4 shows three tabs 38 and three recesses 40 on each of the main body 12 and wing tip 4, but there may be more than or fewer than three recesses 40 and tabs 38 on the main body 12 and wing tip 4. Furthermore, alternative recess and tab shapes may be used or the wing tip 4 and main body 12 may not have tabs and recesses.

Figure 5:
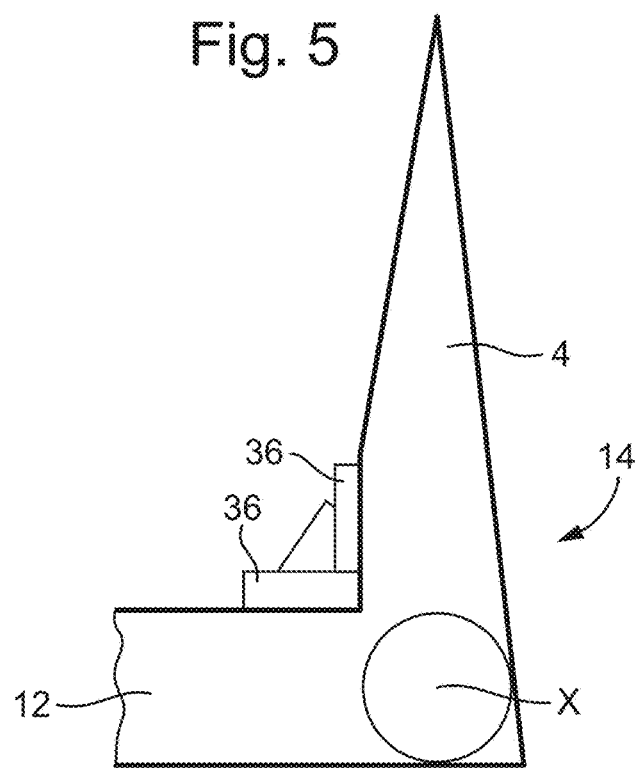
FIG. 5 illustrates a side view of a foldable aircraft wing in the folded position.

FIG. 5 is a side view of the tip assembly 14 in a retracted position. The locking doors 36 are shown in the open position.

The tip assembly described above and herein provides various advantages. Using a linear actuator leads to a reduction in manufacturing and maintenance costs. In addition, it is easier to remove, replace and maintain than other types of actuators (for example rotary actuators). Furthermore, allowing the linear actuator to rotate outside of the wing surface means that the actuator is able to provide a higher moment when the wing tip is retracted than when extended, so that the maximum force requirement of the linear actuator can be reduced.

Although the present disclosure has been described with reference to various embodiments, it will be understood by those skilled in the art that various changes in form and detail may be made without departing from the scope of the invention as set forth in the accompanying claims.

The invention claimed is:

1. A wing for an aircraft comprising a fixed body, a movable tip, and an assembly for moving the movable tip relative to the fixed body, the assembly comprising:
    a linear actuator configured to pivotally attach to both the fixed body and the movable tip, such that the linear actuator is configured to extend between a first pivotal attachment on the fixed body and a second pivotal attachment on the movable tip,
    wherein the linear actuator is configured to repeatedly move the moveable tip from an unfolded position to a folded position, wherein throughout such movement the linear actuator is configured to pivot about both the first and second pivotal attachments;
    wherein the linear actuator defines a line of action of applied force, and the line of action extends between the first pivotal attachment and the second pivotal attachment throughout its range of movement to repeatedly move the movable tip from the unfolded position to the folded position, and
    wherein a lever arm of the linear actuator increases upon the linear actuator moving the movable tip from the unfolded position to the folded position, the lever arm being defined as a perpendicular distance from an axis of rotation of the movable tip to the line of action of applied force.

2. The wing of claim 1, wherein the lever arm of the linear actuator increases from a minimum value when the moveable tip is in the unfolded position to a maximum value when the moveable tip is in the folded position.

3. The wing of claim 1, wherein an angle between the line of action of applied force of the linear actuator and a longitudinal axis of the fixed body increases upon the linear actuator moving the moveable tip from the unfolded position to the folded position.

4. The wing of claim 3, wherein an angle between the line of action of applied force of the linear actuator and a longitudinal axis of the moveable tip increases upon the linear actuator moving the moveable tip from the unfolded position to the folded position.

5. The wing of claim 1, wherein the linear actuator comprises a shaft movable along a longitudinal axis of the linear actuator extending between the first and second pivotal attachments.

6. The wing of claim 1, wherein the linear actuator is configured to rotate the moveable tip through at least about 30 degrees.

7. The wing of claim 1, further comprising locking means configured to selectively prevent movement of the linear actuator.

8. The wing of claim 1, further comprising one or more doors configured to selectively enclose the linear actuator.

9. The wing of claim 7, wherein the locking means is the one or more doors, wherein the doors are configured in a closed position to prevent movement of the linear actuator.

10. The wing of claim 9, wherein the doors are configured to open to allow the linear actuator to pivot about both the first and second pivotal attachments as aforesaid.

11. The wing of claim 1, wherein the movable tip and the fixed body are shaped to allow the movable tip to rotate relative to the fixed body without obstruction.

12. A method of operating the assembly of claim 1, the method comprising:
    using the linear actuator to repeatedly move the movable tip from an unfolded position to a folded position.

* * * * *